(12) United States Patent
Kulavik et al.

(10) Patent No.: US 10,728,730 B2
(45) Date of Patent: Jul. 28, 2020

(54) METHODS AND SYSTEMS FOR AUTOMATIC PAIRING OF HEADSETS TO AUDIO SOURCES BASED ON PROXIMITY

(71) Applicant: Voyetra Turtle Beach, Inc., Valhalla, NY (US)

(72) Inventors: Richard Kulavik, San Jose, CA (US); Michael A. Jessup, San Jose, CA (US)

(73) Assignee: VOYETRA TURTLE BEACH, INC., Valhalla, NY (US)

( * ) Notice: Subject to any disclaimer, the term of this patent is extended or adjusted under 35 U.S.C. 154(b) by 0 days.

(21) Appl. No.: 16/113,606

(22) Filed: Aug. 27, 2018

(65) Prior Publication Data

US 2019/0069151 A1 Feb. 28, 2019

Related U.S. Application Data

(63) Continuation of application No. 15/726,933, filed on Oct. 6, 2017, now Pat. No. 10,064,038, which is a (Continued)

(51) Int. Cl.
*H04W 4/80* (2018.01)
*H04B 5/00* (2006.01)
(Continued)

(52) U.S. Cl.
CPC ............ *H04W 4/80* (2018.02); *H04B 5/0006* (2013.01); *H04W 76/15* (2018.02); *H04W 84/18* (2013.01)

(58) Field of Classification Search
CPC .. H04B 5/0006; H04W 4/008; H04W 76/025; H04W 84/18; H04W 88/08; A63F 13/10;
(Continued)

(56) References Cited

U.S. PATENT DOCUMENTS 8,602,892 B1 12/2013 Reiss et al.
9,143,878 B2 9/2015 Kulavik et al.
(Continued)

FOREIGN PATENT DOCUMENTS

JP 2002369972 12/2002

OTHER PUBLICATIONS

Specification of the Bluetooth System Version 1.1 Feb. 22, 2001.

*Primary Examiner* — Devan A Sandiford
(74) *Attorney, Agent, or Firm* — McAndrews, Held & Malloy, Ltd.

(57) ABSTRACT

A headset, which may be configured to process audio for a player participating in an online multiplayer game, may support auto-pairing with audio basestations. In this regard, an audio basestation may be utilized in communicating game and chat audio content from an associated game console to a paired headset and in communicating microphone audio from the paired headset to the console. The auto-pairing may comprise automatically exchanging signals with an audio basestation, in response to the headset coming within a determined distance of the audio basestation; and pairing with the audio basestation based on processing of the exchanged signals. The pairing may result in establishing one or more wireless links for game and chat audio to be communicated to the headset and microphone audio to be communicated from the headset. The determined distance may correspond to physical contact (e.g., tapping) between the headset and the basestation.

20 Claims, 11 Drawing Sheets

Related U.S. Application Data continuation of application No. 14/448,575, filed on Jul. 31, 2014, now Pat. No. 9,788,139.

(60) Provisional application No. 61/891,199, filed on Oct. 15, 2013.

(51) Int. Cl.
*H04W 76/15* (2018.01)
*H04W 84/18* (2009.01)

(58) Field of Classification Search
CPC .......... A63F 13/12; A63F 13/20; A63F 13/23; A63F 13/235
See application file for complete search history.

(56) References Cited

U.S. PATENT DOCUMENTS

| | | | |
|---|---|---|---|
| 2002/0110246 A1* | 8/2002 | Gosior | A63F 13/12 381/2 |
| 2002/0119822 A1* | 8/2002 | Kunzle | A63F 13/12 463/42 |
| 2004/0063497 A1 | 4/2004 | Gould | |
| 2005/0166117 A1* | 7/2005 | Suwa | H04L 1/0063 714/746 |
| 2006/0084504 A1 | 4/2006 | Chan et al. | |
| 2008/0039206 A1 | 2/2008 | Ackley et al. | |
| 2008/0113788 A1 | 5/2008 | Alderucci | |
| 2008/0220878 A1* | 9/2008 | Michaelis | A63F 13/12 463/42 |
| 2009/0002316 A1 | 1/2009 | Rofougaran | |
| 2010/0021176 A1* | 1/2010 | Holcombe | H04B 10/1143 398/115 |
| 2010/0045441 A1* | 2/2010 | Hirsch | H04B 5/0012 340/10.1 |
| 2010/0150383 A1 | 6/2010 | Sampat | |
| 2010/0287273 A1* | 11/2010 | Nasir | H04W 48/18 709/224 |
| 2011/0130203 A1* | 6/2011 | Reiss | A63F 13/12 463/35 |
| 2012/0014553 A1 | 1/2012 | Bonanno | |
| 2012/0122577 A1 | 5/2012 | Aronzon | |
| 2012/0252541 A1* | 10/2012 | Thakur | H04M 1/6066 455/574 |
| 2012/0315983 A1 | 12/2012 | Miller, IV et al. | |
| 2013/0143654 A1 | 6/2013 | Aronzon | |
| 2013/0288759 A1 | 10/2013 | Rom et al. | |
| 2013/0288795 A1* | 10/2013 | Reiss | A63F 13/12 463/35 |
| 2014/0073429 A1* | 3/2014 | Meneses | H04S 3/004 463/35 |
| 2014/0243057 A1 | 8/2014 | Rom et al. | |
| 2014/0274399 A1 | 9/2014 | Mahlmeister et al. | |
| 2015/0105014 A1 | 4/2015 | Kulavik et al. | |
| 2015/0182853 A1 | 7/2015 | Weaver | |
| 2015/0356030 A1 | 12/2015 | Zahand et al. | |
| 2016/0250548 A1* | 9/2016 | Tsuchiya | A63F 13/493 463/36 |

\* cited by examiner

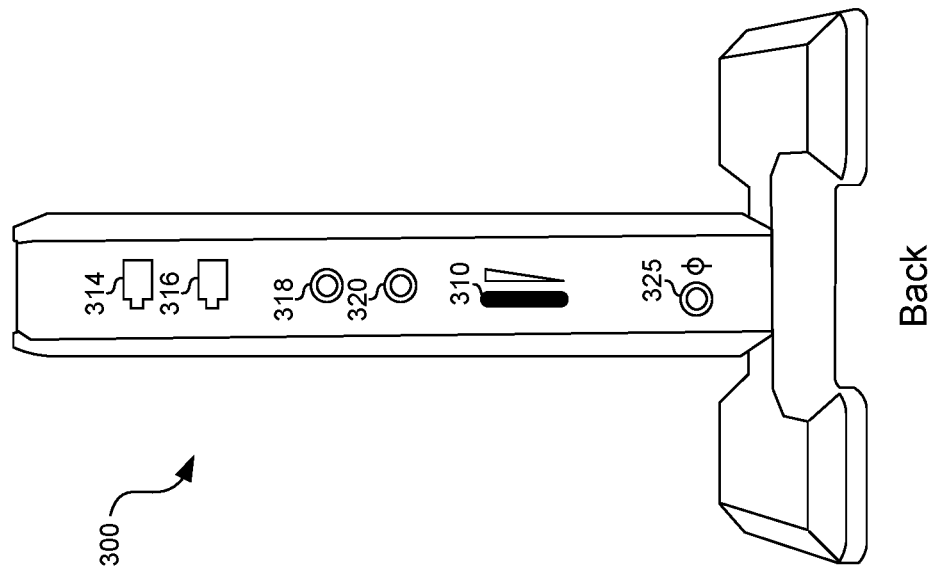
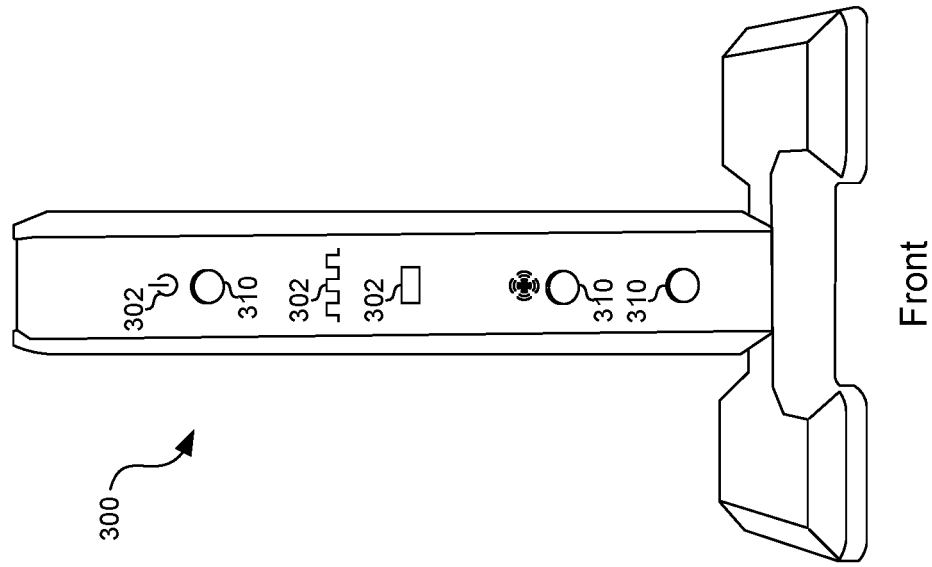
FIG. 3A

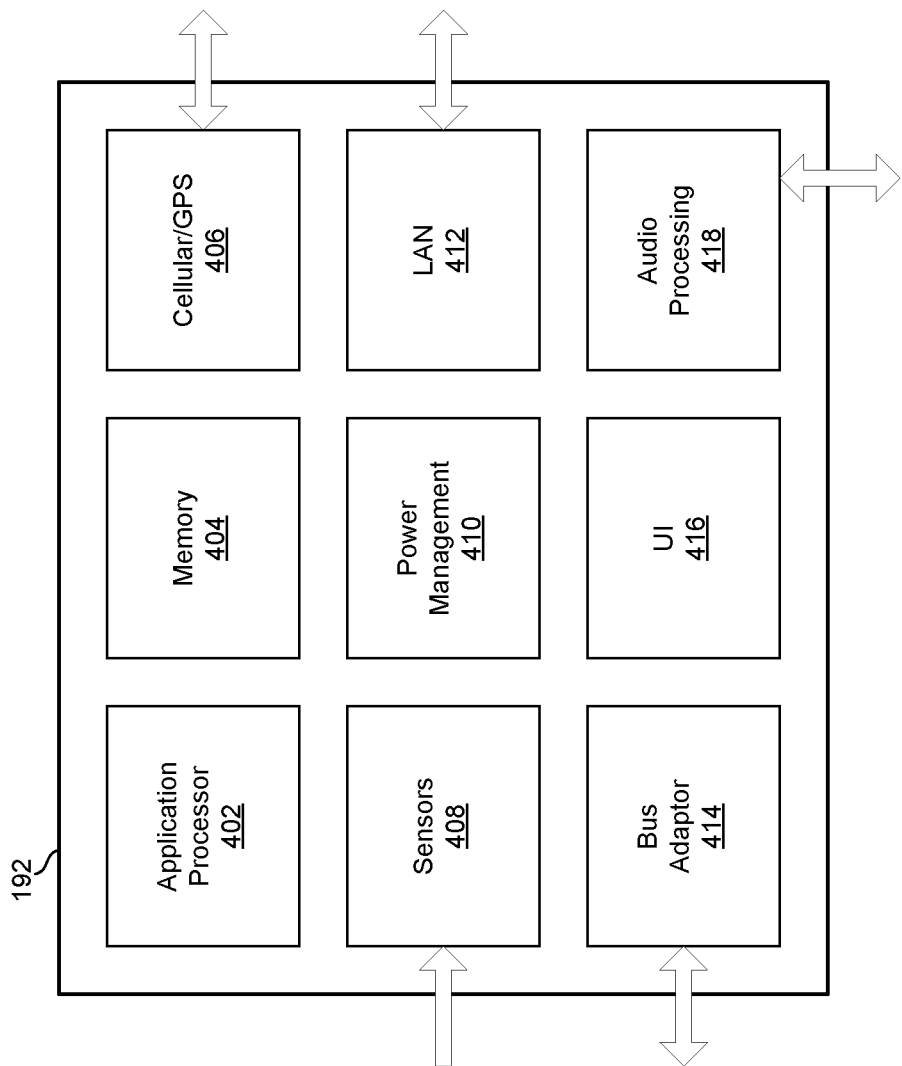

METHODS AND SYSTEMS FOR AUTOMATIC PAIRING OF HEADSETS TO AUDIO SOURCES BASED ON PROXIMITY

CLAIM OF PRIORITY

This patent application is a continuation of U.S. patent application Ser. No. 15/726,933, filed on Oct. 6, 2017, which is a continuation of U.S. patent application Ser. No. 14/448,575, filed on Jul. 31, 2014, which makes reference to, claims priority to and claims benefit from the U.S. Provisional Patent Application Ser. No. 61/891,199, filed on Oct. 15, 2013 and entitled "Auto-Pairing of Headset to Headset Basestation."

Each of the above identified applications is hereby incorporated herein by reference in its entirety.

INCORPORATION BY REFERENCE

The entirety of each of the following applications is hereby incorporated herein by reference: U.S. patent application Ser. No. 13/040,144 titled "Gaming Headset with Programmable Audio" and published as US2012/0014553. The above identified application is hereby incorporated herein by reference in its entirety.

TECHNICAL FIELD

Aspects of the present application relate to electronic gaming. More specifically, to methods and systems for auto-pairing of headset to headset basestation.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for auto-pairing of headset to headset basestation, substantially as illustrated by and/or described in connection with at least one of the figures, as set forth more completely in the claims.

BRIEF DESCRIPTION OF THE DRAWINGS

FIG. 3A depicts two views of an example embodiment of an audio basestation.

FIG. 4 depicts a block diagram of an example multi-purpose device.

DETAILED DESCRIPTION

Figure 1A:
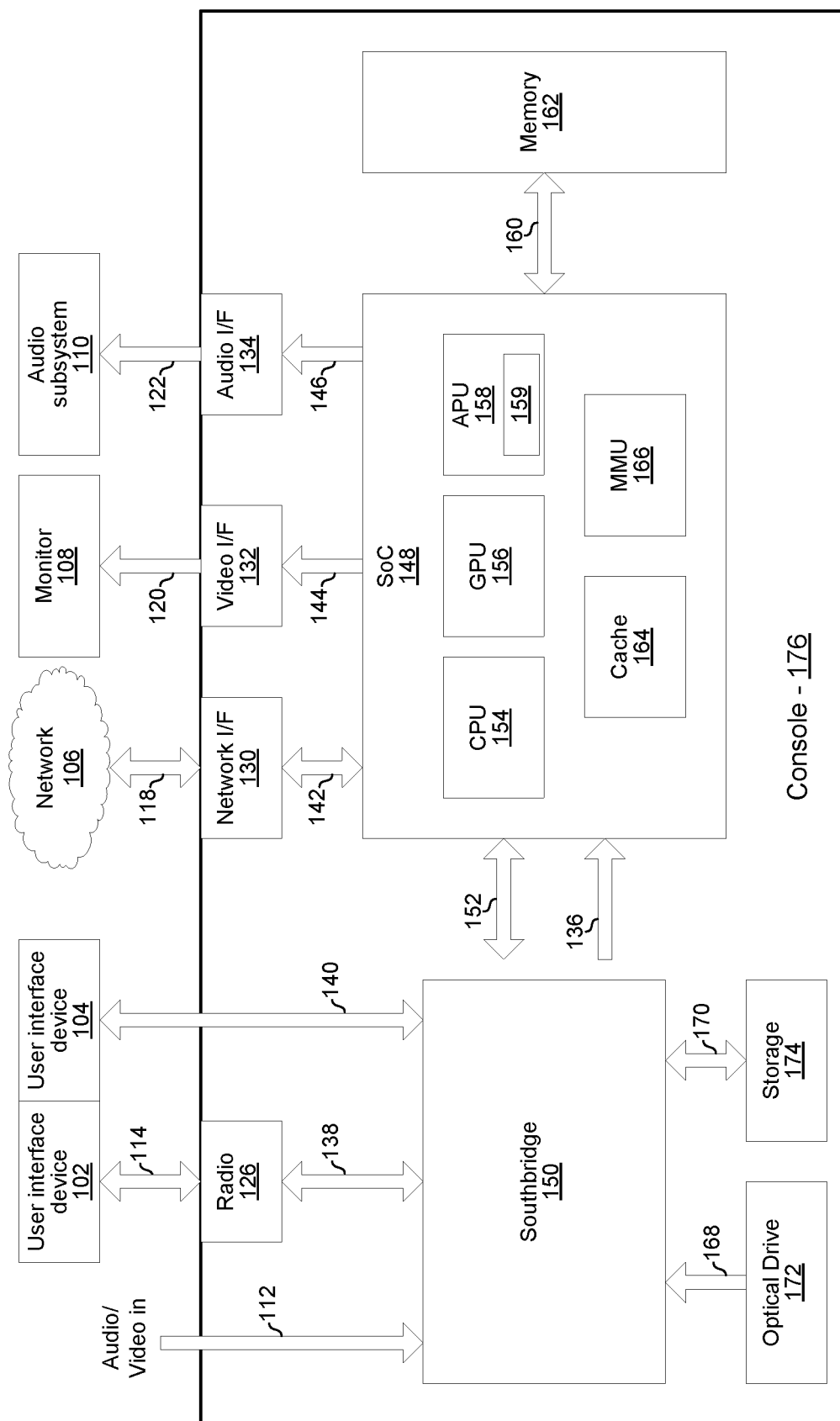
FIG. 1A depicts an example gaming console.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Referring to FIG. 1, there is shown game console 176 which may be, for example, a Windows computing device, a Unix computing device, a Linux computing device, an Apple OSX computing device, an Apple iOS computing device, an Android computing device, a Microsoft Xbox, a Sony PlayStation, a Nintendo Wii, or the like. The example game console 176 comprises a video interface 124, radio 126, data interface 128, network interface 130, video interface 132, audio interface 134, southbridge 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 112, 138, 140, 142, 144, 146, 152, 136, 160, 168, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 may receive audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 comprises circuitry operable to communicate in accordance with one or more wireless standards such as the IEEE 802.11 family of standards, the Bluetooth family of standards, and/or the like.

The network interface 130 may comprise circuitry operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 may comprise circuitry operable to communicate audio in accordance with one or more wired or wireless audio transmission standards. For example, the audio interface 134 may receive CEA-861-E compliant video data via link 144 and encapsulate/format/etc. the video data in accordance with an HDMI standard for output to the monitor 108 via an HDMI link 120.

The central processing unit (CPU) 154 may comprise circuitry operable to execute instructions for controlling/coordinating the overall operation of the game console 176. Such instructions may be part of an operating system of the console and/or part of one or more software applications running on the console.

The graphics processing unit (GPU) 156 may comprise circuitry operable to perform graphics processing functions such as compression, decompression, encoding, decoding, 3D rendering, and/or the like.

The audio processing unit (APU) 158 may comprise circuitry operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings that affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to a user interface device 102, a user interface device 104, a network 106, a monitor 108, and audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the subsystem 110 via link(s) 122 (e.g., S/PDIF for digital audio or "line out" for analog audio). Additional details of an example audio subsystem 110 are described below.

Figure 1B:
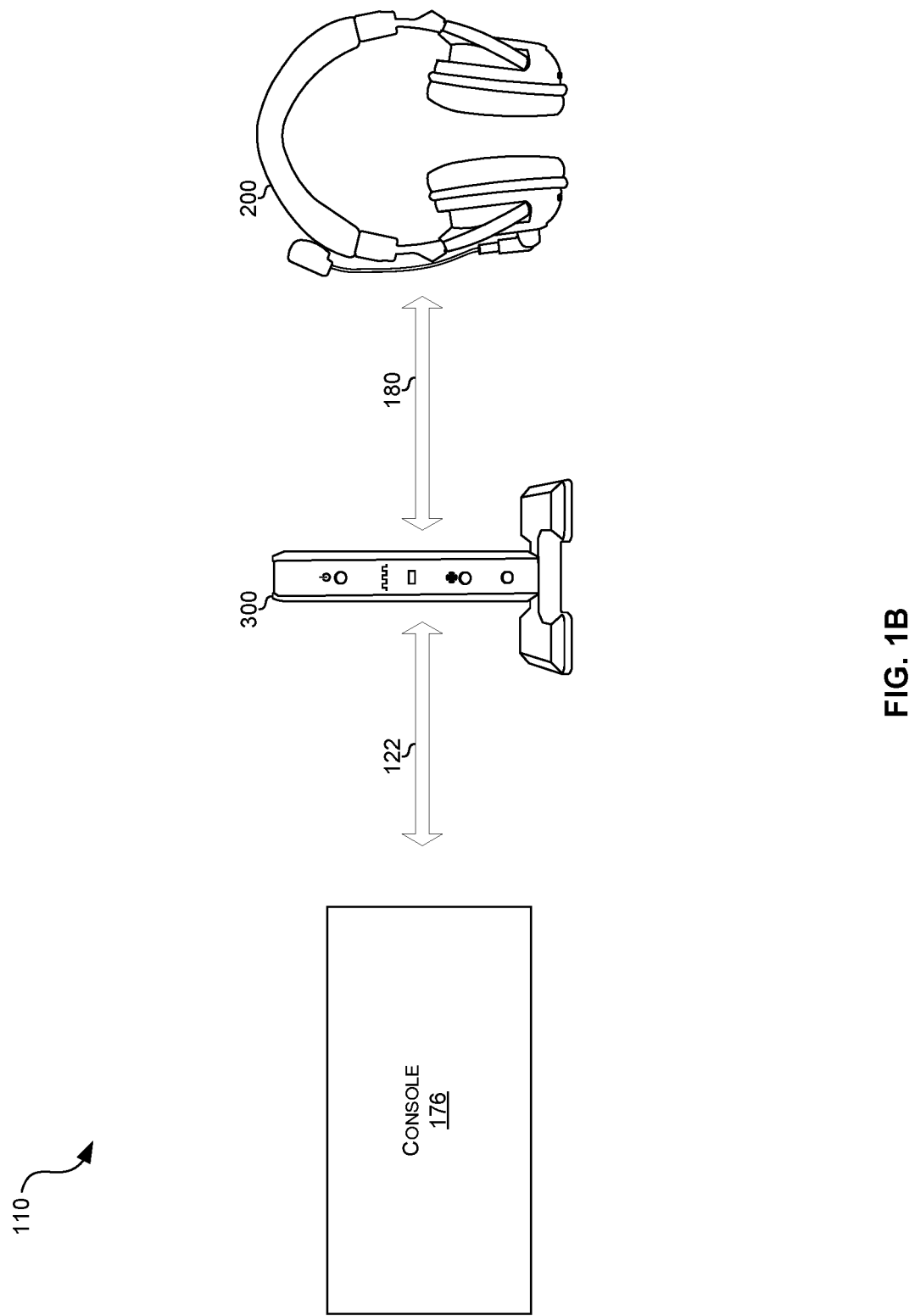
FIG. 1B depicts an example gaming audio subsystem comprising a headset and an audio basestation.
Figure 1C:
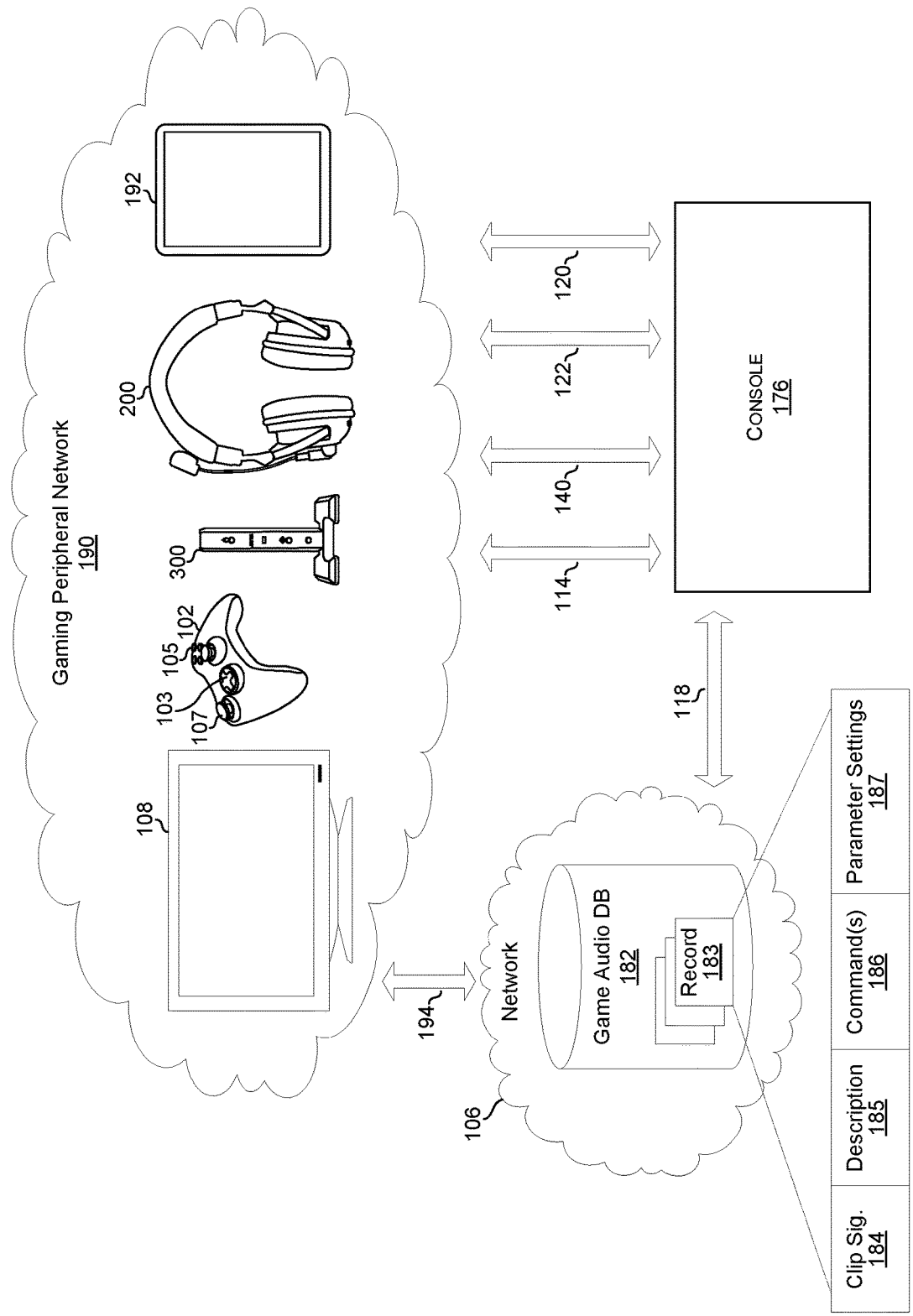
FIG. 1C depicts the example gaming console and an associated network of peripheral devices.

FIG. 1B depicts an example gaming audio subsystem comprising a headset and an audio basestation. Shown are a headset 200 and an audio basestation 300. The headset 200 communicates with the basestation 300 via a link 180 and the basestation 300 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 300 may be as described below with reference to FIGS. 3A-3B.

Referring to FIG. 1C, again shown is the console 176 connected to a plurality of peripheral devices and a network 106. The example peripheral devices shown include a monitor 108, a user interface device 102, a headset 200, an audio basestation 300, and a multi-purpose device 192.

The monitor 108 and user interface device 102 are as described above. An example implementation of the headset 200 is described below with reference to FIGS. 2A-2C. An example implementation of the audio basestation is described below with reference to FIGS. 3A-3B.

The multi-purpose device 192 may be, for example, a tablet computer, a smartphone, a laptop computer, or the like and that runs an operating system such as Android, Linux, Windows, iOS, OSX, or the like. An example implementation of the multi-purpose device 192 is described below with reference to FIG. 4. Hardware (e.g., a network adaptor) and software (e.g., the operating system and one or more applications loaded onto the device 192) may configure the device 192 for operating as part of the GPN 190. For example, an application running on the device 192 may cause display of a graphical user interface via which a user can access gaming-related data, commands, functions, parameter settings, etc. and via which the user can interact with the console 176 and the other devices of the GPN 190 to enhance his/her gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 300 in a single hop (e.g., over a proprietary RF link) and with the device 192 in a single hop (e.g., over a Bluetooth or Wi-Fi direct link), while the tablet may communicate with the basestation 300 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
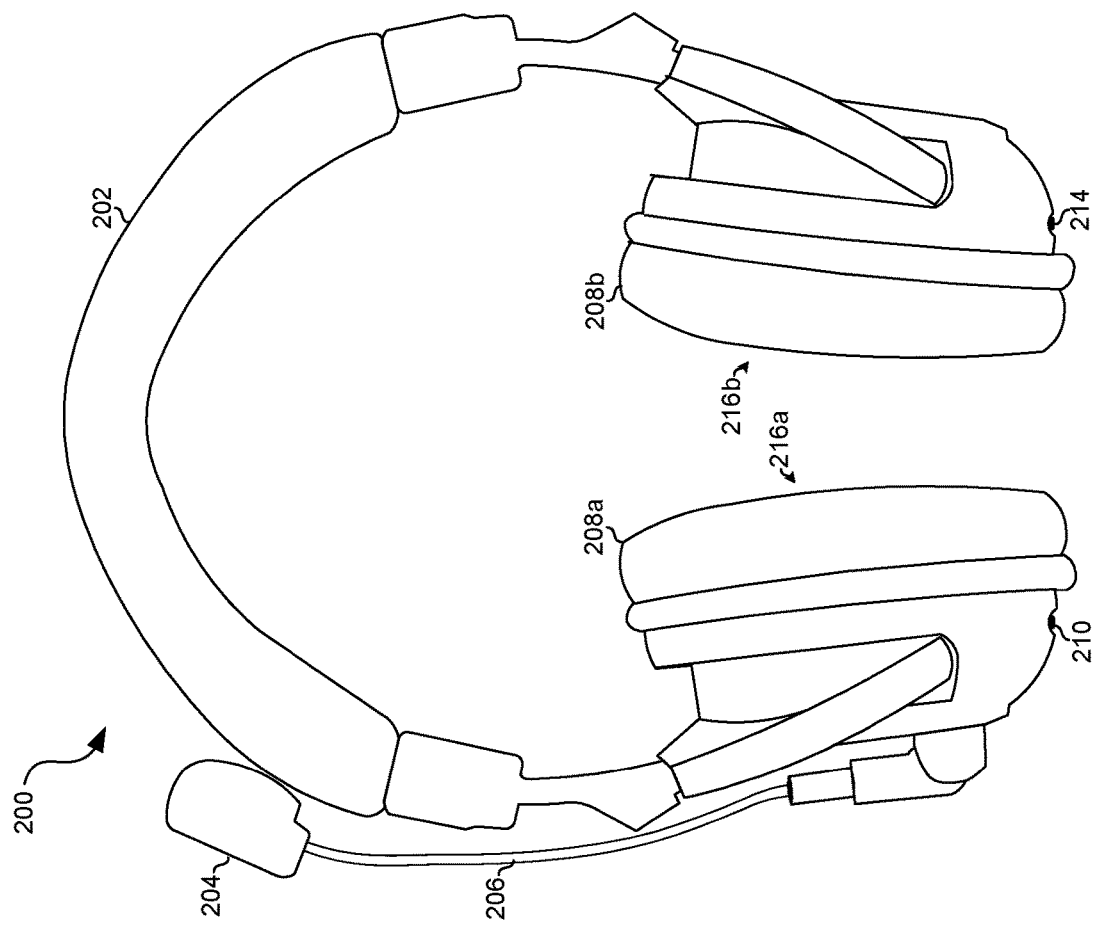
FIGS. 2A and 2B depict two views of an example embodiment of a gaming headset.
Figure 2B:
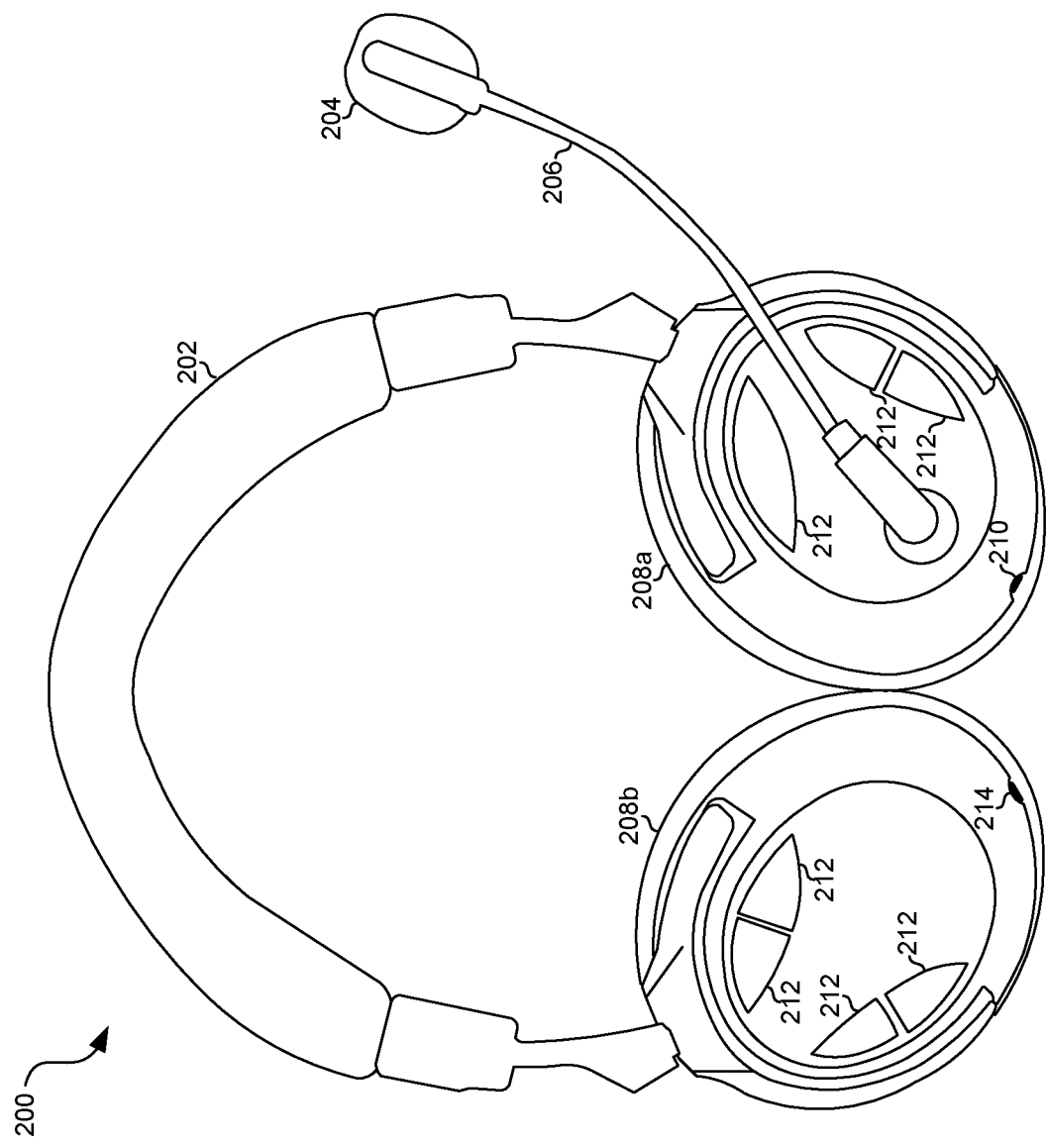

Referring to FIGS. 2A and 2B, there is shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., console 176, basestation 300, a smartphone, and/or the like) that is in communication with the headset.

The speakers 216a and 216b convert electrical signals to soundwaves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
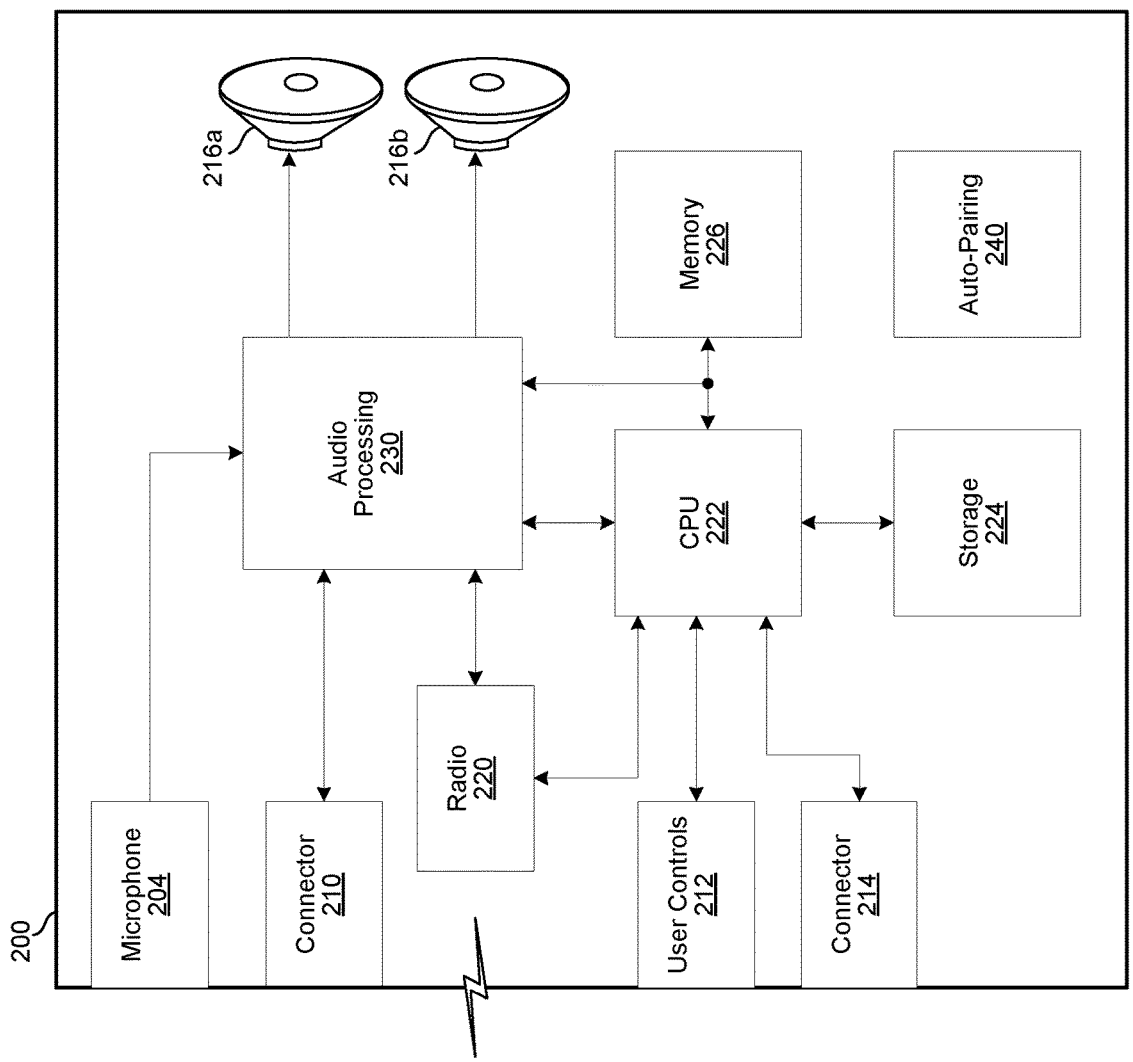
FIG. 2C depicts a block diagram of the example headset of FIGS. 2A and 2B.

FIG. 2C depicts a block diagram of the example headset 200. In addition to the connector 210, user controls 212, connector 214, microphone 204, and speakers 216a and 216b already discussed, shown are a radio 220, a CPU 222, a storage device 224, a memory 226, an audio processing circuit 230, and an auto-pairing component 240.

The radio 220 may comprise circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 300).

The CPU 222 may comprise circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 may comprise, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230. As another example, one or more parameter settings may determine, at least in part, whether and which sound effects are added to audio signals in the audio processing circuitry 230 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The memory 226 may comprise volatile memory used by the CPU 230 and/or audio processing circuit 230 as program memory, for storing runtime data, etc.

The audio processing circuit 230 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216a and 216b. Additionally, or alternatively, the processing may be performed on chat audio that is subsequently output to the connector 210 and/or radio 220.

In an example implementation, the headset 200 may be configured to support auto-pairing operation. A headset, such as the headset 200, may pair with another device (e.g., audio basestation 300), for supporting audio operations—e.g., communication of audio content exchanged during online gaming. For example, the headset 200 may pair with the audio basestation 300 thus enabling establishing of the link 180 therebetween, which may be used in communicating audio between the headset 200 and the game console 176 via the audio basestation 300. With auto-pairing, the devices (e.g., the headset 200 and the audio basestation 300) may be operable to perform, automatically and/or autonomously, necessary operations for ensuring pairing of the devices. This may comprise determining the presence of the would-be paired-with device(s); assessing availability and/or suitability of these devices for pairing (e.g., including validating the devices and/or users associated therewith); establishing the links between the devices (or at least exchanging information required for establishing such links); and/or securing any such established links (e.g., determining applicable encryption protocol and/or exchanging information relating thereto).

To support auto-pairing operations, dedicated components may be used and/or incorporated into the devices engaging in such auto-pairing. The headset 200 may incorporate the auto-pairing component 240, which may comprise suitable circuitry, logic, code and/or interfaces for controlling and/or managing the auto-pairing, and/or performing various functions or operations related thereto, in the headset 200. For example, the auto-pairing component 240 may support use of suitable interfaces that may be utilized in communicating signals that may be used in detecting devices to pair with, and/or in exchanging information therewith for use in the pairing with these devices.

In one example embodiment, the auto-pairing may be configured based on use of near field communication (NFC) or similar interfaces/protocols. The auto-pairing may be initiated and/or done by tapping the devices (or placing them in close proximity), thus triggering the necessary communication of signals and/or exchange of information therebetween. Accordingly, the auto-pairing component 240 may incorporate a NFC transceiver, which may be utilized in transmitting and/or receiving NFC signals, such as when the headset 200 is tapped against a device with which the headset 200 may attempt to pair. Thus, the headset 200 may simply be auto-paired (or attempted to) with any devices against which it is tapped.

FIG. 3A depicts two views of an example embodiment of the audio basestation 300. The basestation 300 comprises status indicators 302, user controls 310, power port 325, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 300 is powered on, whether audio data is being received by the basestation 300 via connectors 314, and/or what type of audio data (e.g., Dolby Digital) is being received by the basestation 300.

Figure 3B:
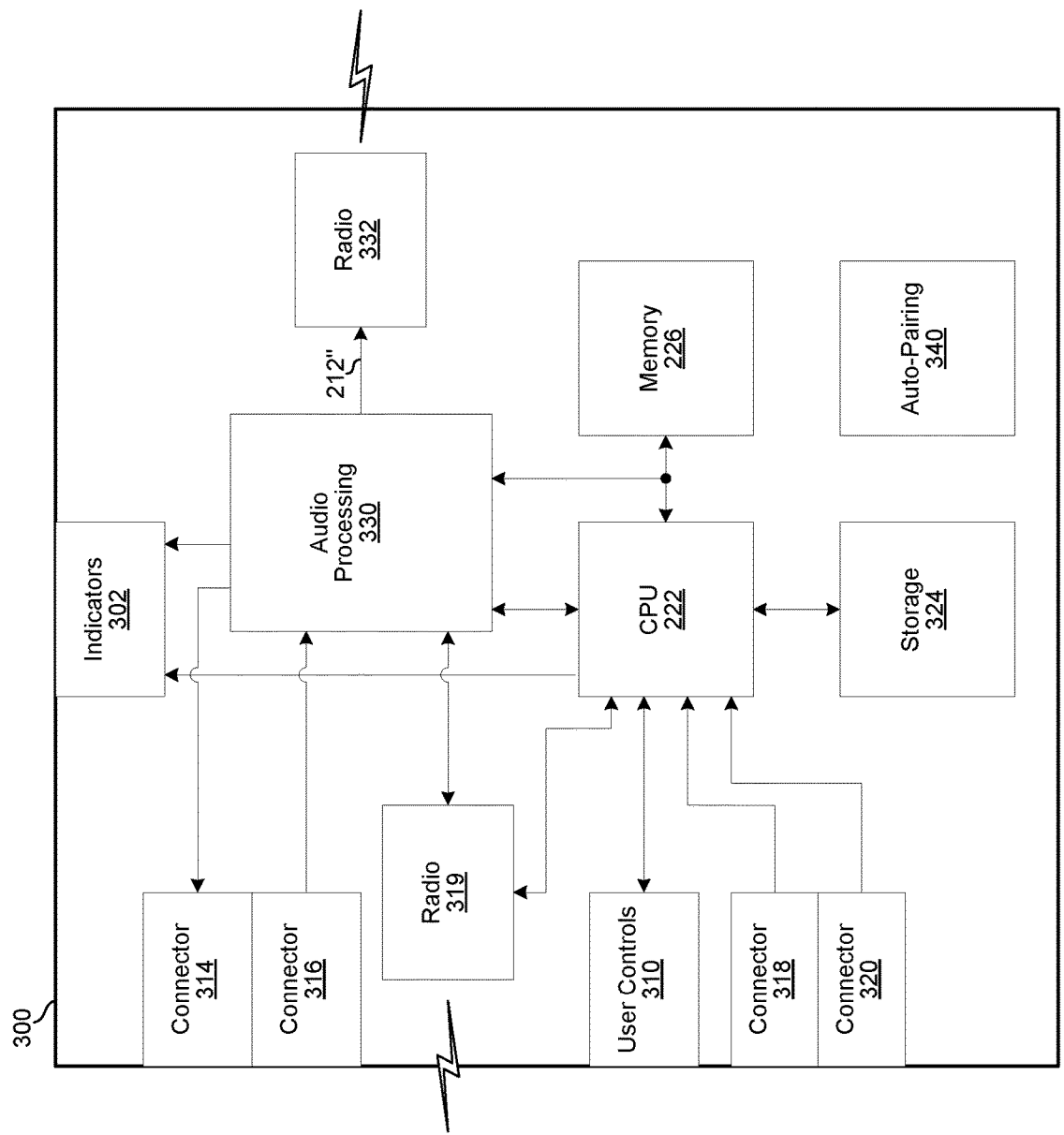
FIG. 3B depicts a block diagram of the audio basestation 400.

FIG. 3B depicts a block diagram of the audio basestation 300. In addition to the user controls 310, indicators 302, and connectors 314, 316, 318, and 320 described above, the block diagram additionally shows a CPU 322, a storage device 324, a memory 326, a radio 319, an audio processing circuit 330, a radio 332, and an auto-pairing component 340.

The radio 319 comprises circuitry operable to communicate in accordance with one or more standardized (such as the IEEE 802.11 family of standards, the Bluetooth family of standards, and/or the like) and/or proprietary (e.g., proprietary protocol for receiving audio protocols for receiving audio from a console such as the console 176) wireless protocols.

The radio 332 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to headphones 200).

The CPU 322 comprises circuitry operable to execute instructions for controlling/coordinating the overall operation of the audio basestation 300. Such instructions may be part of an operating system or state machine of the audio basestation 300 and/or part of one or more software applications running on the audio basestation 300. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuitry 330. Such data may include, for example, parameter settings that affect processing of audio signals in the basestation 300. For example, one or more parameter settings may determine, at least in part, a gain of one or gain elements of the audio processing circuitry 330. As another example, one or more parameter settings may determine, at least in part, a frequency response of one or more filters that operate on audio signals in the audio processing circuitry 330. As another example, one or more parameter settings may determine, at least in part, whether and which sound effects are added to audio signals in the audio processing circuitry 330 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the basestation 300 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 300. Additionally, or alternatively, the processing may be performed on a microphone audio signal that is subsequently output to a device (e.g., console 176) in communication with the basestation 300.

In an example implementation, the audio basestation 300 may be configured to support auto-pairing operations, substantially as described with respect to FIG. 2C, for example. The audio basestation 300 may be operable to support auto-pairing initiated by headsets, such as for example the headset 200. This may include, for example, auto-pairing performed using NFC (or similar) interfaces and/or auto-pairing initiated and/or done by tapping the headset against the audio basestation 300. Audio basestation 300 may incorporate the auto-pairing component 340, which may comprise suitable circuitry, logic, code and/or interfaces for controlling and/or managing the auto-pairing, and/or performing various functions or operations related thereto, in the audio basestation 300. Accordingly, the auto-pairing component 340 may support use of suitable interfaces that may be utilized in communicating signals that may be used in detecting devices to pair with, and/or in exchanging information therewith for use in the pairing with these devices. For example, in instances where the auto-pairing is conducted based on tapping of devices (or being placed in close proximity) and/or exchange of signals over NFC interfaces, the auto-pairing component 340 may incorporate a NFC transceiver, which may be utilized in transmitting and/or receiving NFC signals, such as when a headset is tapped against the audio basestation 300.

FIG. 4 depicts a block diagram of an example multi-purpose device 192. The example multi-purpose device 192 comprises a an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises circuitry operable to execute instructions for controlling/coordinating the overall operation of the multi-purpose device 192 as well as graphics processing functions of the multi-purpose device 402. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads writes to memory.

The cellular/GPS networking subsystem 406 comprises circuitry operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises circuitry operable to manage distribution of power among the various components of the multi-purpose device 192.

The LAN subsystem 412 comprises circuitry operable to perform baseband processing and analog/RF processing for transmission and reception of cellular and GPS signals.

The bus adaptor 414 comprises circuitry for interfacing one or more internal data busses of the multi-purpose device with an external bus (e.g., a Universal Serial Bus) for transferring data to/from the multi-purpose device via a wired connection.

The user interface subsystem 416 comprises circuitry operable to control and relay signals to/from a touchscreen, hard buttons, and/or other input devices of the multi-purpose device 192.

The audio processor 418 comprises circuitry to process (e.g., digital to analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
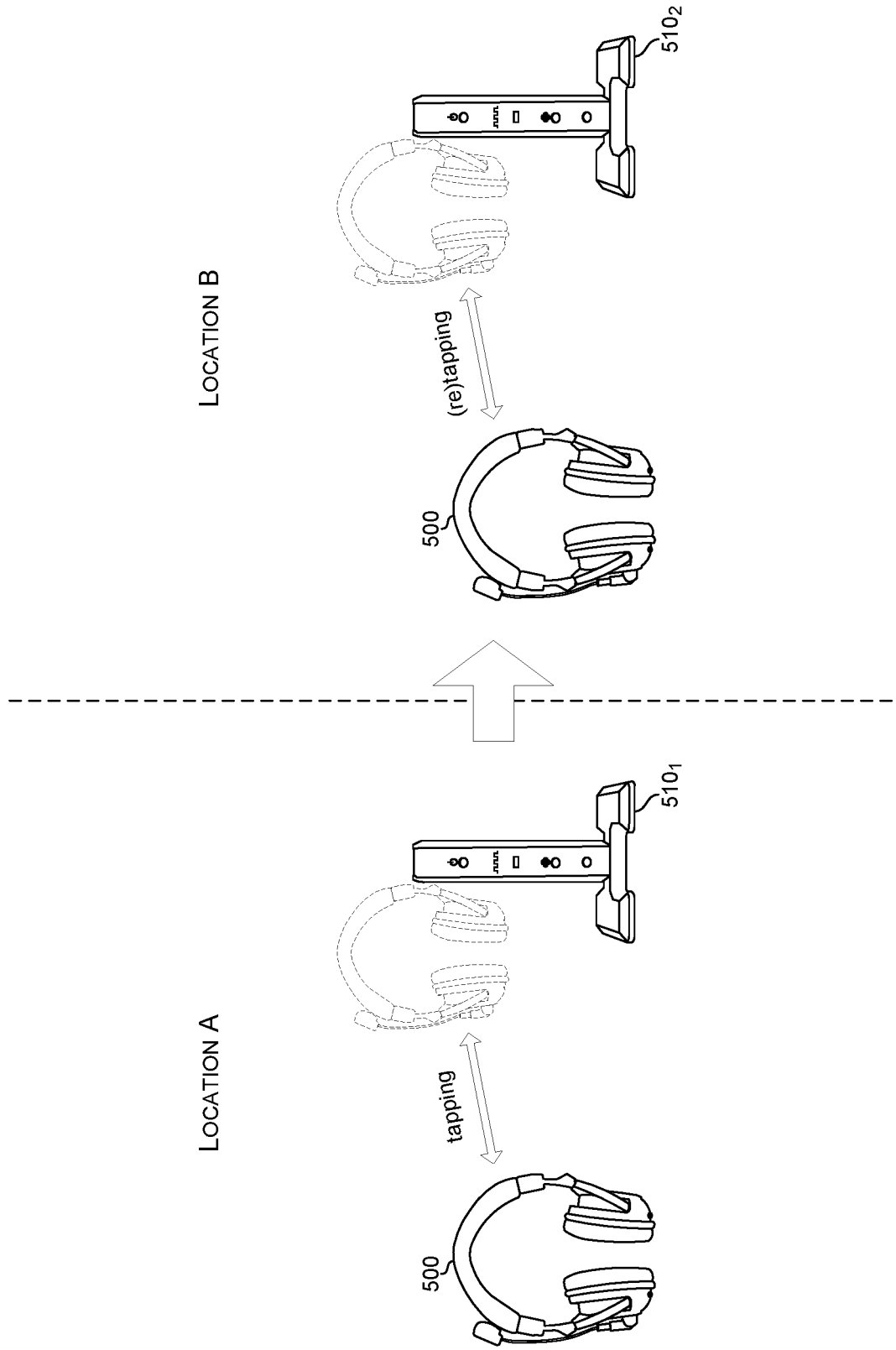
FIG. 5 depicts a block diagram illustrating an example gaming headset that is configured to support auto-pairing with different basestations.

FIG. 5 depicts a block diagram illustrating an example gaming headset that is configured to support auto-pairing with different basestations. Referring to FIG. 5, there is shown a headset 500 and two audio basestations 510$_1$ and 510$_2$.

The headset 500 may be similar to the headset 200, substantially as described with respect to, for example, FIG. 2C. Each of the audio basestations 510$_1$ and 510$_2$ may be similar to the audio basestation 300, substantially as described with respect to, for example, FIG. 3C. Accordingly, the headset 500 and the audio basestations 510$_1$ and 510$_2$ may be operable to support processing and/or communication of audio in different situations, including during, for example, online gaming. In some instances, the headset 500 and the audio basestations 510$_1$ and 510$_2$ may support auto-pairing, substantially as described with respect to FIGS. 2C and 3C for example.

In the example use scenario shown in FIG. 5, the headset 200 may first auto-pair (or attempt to do so) with the audio basestation 510$_1$, which may be located at a first location (location A). Location A may correspond to a room (e.g., living room) in residence of a player (user of headset 200), and the audio basestation 510$_1$ may be associated with the player. For example, the auto-pairing may be initiated and/or done by tapping the headset 200 against the audio basestation 510$_1$, whereby signals pertaining to the pairing may be exchanged over, e.g., NFC interfaces (using NFC transceivers in each of the headset 200 and the audio basestation 510$_1$). The exchanged signals may comprise information enabling identifying the devices (make, model, etc.), information relating to the devices (e.g., capabilities, available resources, etc.), information relating to device users (e.g., identification and/or validation related information), information relating to the intended use (e.g., players preferences, operation settings, etc.), frequency of channel to be used (for a frequency division multiple access channel), time slot to be used (for a time division multiple access channel), spreading code to be used (for a code division multiple access channel), and/or the like. In some instances, the exchanged signals may also comprise information utilized in securing interactions between the devices once paired (e.g., keys, certificates, and/or other encryption related information). The exchanged signals may be then be processed (e.g., to extract information embedded therein), and the devices may (or not) pair based on the processing. Successful pairing may entail establishing one or more link (e.g., similar to the link 180), which may be used in communicating audio (e.g., game, chat, and/or microphone audio).

Subsequently, the headset 200 may auto-pair (or attempt to do so) with the audio basestation $510_2$, which may be located at a second location (location B). Location B may correspond to a different room (e.g., bed room) in the residence of the player (user of headset 200). In some instances, however, the audio basestation $510_2$ (or the first paired-with audio basestation $510_1$) may be located somewhere that may be not be specifically associated with the player (e.g., at friend's residence, and as such the audio basestation $510_2$ may be associated with the friend; or at a common play site (e.g., arcade), and thus the audio basestation $510_2$ may not be associated with particular user). The auto-pairing may be initiated and/or done in similar manner as described with respect with respect to the auto-pairing with the audio basestation $510_1$—e.g., by tapping the headset 200 against the audio basestation $510_2$, with signals pertaining to the pairing may be exchanged over, e.g., NFC interfaces (using NFC transceivers in each of the headset 200 and the audio basestation $510_2$). The exchanged signals may be then be processed (e.g., to extract information embedded therein), and the devices may pair (or not) based on the processing. Successful pairing may entail establishing one or more link (e.g., similar to the link 180), which may be used in communicating audio (e.g., pertaining to audio content during online gaming).

In some instances, headsets may be configured to support pairing to multiple devices at the same time. For example, when the headset 500 successfully pairs with the second audio basestation $510_2$, the headset 500 may remain paired with the first audio basestation $510_1$ (with which the headset 500 was initially paired). This may entail, however, determining whether maintaining pairing with prior-paired-with devices is possible, and if it is needed or desired (e.g., by the user). For example, after pairing successfully with the second audio basestation $510_2$, the headset 500 may determine whether it may remain paired with the first audio basestation $510_1$ (e.g., whether keeping existing links or establishing substitute links therebetween may be possible). Furthermore, the player (user of the headset 200) may be prompted to configure whether maintaining pairing with prior-paired-with basestations is desired, such as before attempting to maintain such pairing(s).

In some instances, a single basestation may support concurrent pairing with multiple headsets. In this regard, different channels may be utilized for pairing with the different headsets. For example, a first link between first headset and basestation $510_1$ may be on first channel and second link between second headset and basestation $510_1$ may be on a second channel such that multiple players can play via single consoles and single basestation.

Figure 6:
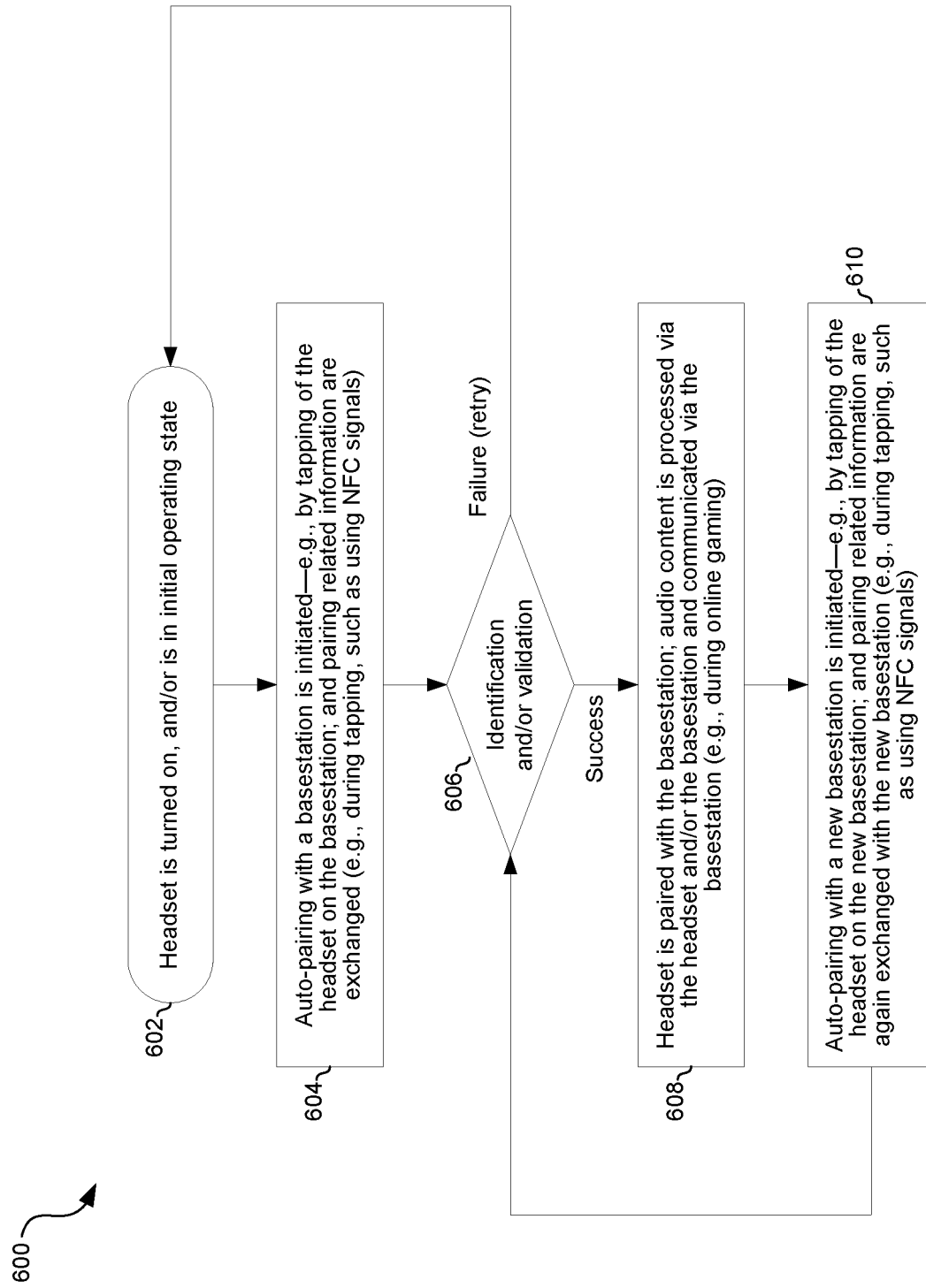
FIG. 6 is a flowchart illustrating an example process for auto-pairing of headset to headset basestation.

FIG. 6 is a flowchart illustrating an example process for auto-pairing of headset to headset basestation. Referring to FIG. 6, there is shown a flow chart 600, comprising a plurality of example steps.

In starting step 602, a headset (e.g., the headset 500) may be turned on and/or set to an initial operating state, whereby the headset may be ready for outputting of audio (e.g., microphone audio) and/or handling of input audio (e.g., game and/or chat audio).

In step 604, auto-pairing of the headset with a basestation is initiated, and pairing related information may be exchanged between the headset and the basestation. For example, the auto-pairing may be initiated by tapping of the headset onto the basestation. The pairing related information may then be exchanged during tapping, such as using suitable interfaces/signals (e.g., NFC interface signals). In step 606, the exchanged pairing related information may be processed. The processing may comprise identification and/or validation of the headset, the basestation, and/or the user (player) utilizing the headset. In instances where the processing of the exchanged pairing related information results in failure, the process may loop back to step 604 (e.g., to re-try auto-pairing attempting, such as be re-tapping the headset).

Returning to step 606, instances where the processing of the exchanged pairing related information results in success, the process may proceed to step 608. In step 608, the headset may be paired with the basestation, and audio content may be then be handled (e.g., processed) via the headset and/or the basestation and communicated via the basestation (e.g., during online gaming).

In step 610, auto-pairing with a new (different) basestation may be initiated. The auto-pairing with a new (different) basestation may be initiated by tapping the headset onto the new basestation. The pairing related information may again be exchanged with the new basestation (e.g., during tapping, such as using NFC signals), and the process may loop back to step 606 (for processing of the new pairing related information).

Various embodiments of the invention may comprise a system and a method for auto-pairing headset 500s and corresponding devices, such as audio basestations. For example, the headset 500, which may be configurable to process audio for a player (user of the headset 500) participating in an online multiplayer game, may be operable to automatically exchange signals with an audio basestation, such as the audio basestation $510_1$, in response to the headset 500 coming within a determined distance of the audio basestation $510_1$. In this regard, the audio basestation $510_1$ may be utilized in communicating game and chat audio content from an associated game console to any headset paired with the audio basestation $510_1$ and in communicating microphone audio from the paired headset to the associated game console. The headset 500 may then pair with the audio basestation $510_1$ based on the processing of the exchanged signals, with the pairing resulting in establishing one or more wireless links for game and chat audio to be communicated to the headset 500 from the audio basestation $510_1$ and microphone audio to be communicated to the audio basestation $510_1$ from the headset 500. The audio basestation $510_1$ may be integrated into an associated game console, or may be a stand-alone device. The determined distance may correspond to physical contact between the headset 500 and the audio basestation $510_1$. The physical contact may correspond to, for example, tapping of the headset 500 onto the audio basestation $510_1$. The exchanged signals may comprise identification and/or validation information. The processing of the exchanged signals may comprise identifying and/or validating one or both of the player and the audio basestation based on the processing of the exchanged signals. The exchanged signals may be communicated over suitable interfaces, such as near filed communication (NFC) interface, between the headset 500 and the audio basestation $510_1$. In this regard, the headset 500 and the audio basestation $510_1$ may comprise a near field communication (NFC) circuitry (e.g., transceiver and related processing circuitry) for facilitating the exchanging of signals via the NFC interface. The headset 500 may be operable to pair with another audio basestation, such as the audio basestation $510_2$, in a similar manner—e.g., based on automatic exchange of signals between the headset 500 and with the audio basestation $510_2$, and processing of the exchanged signals. Furthermore, in some instances, the headset 500 may maintain pairing with the audio basestation $510_1$ after pairing with the second audio basestation $510_2$. In this regard, the headset 500 may determine whether to maintain the pairing with the audio basestation $510_1$ after pairing with the second audio basestation $510_2$, such as based on availability of communication links between the headset 500 and the audio basestation $510_1$ and/or user input.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system, comprising:
 a headset that is configurable to process audio for a player participating in an online multiplayer game, the headset being operable to:
  communicate signals with an audio basestation in response to one or both of the headset coming within a determined distance of the audio basestation and a user action by the user on the headset in relation to the audio basestation, wherein the audio basestation is associated with a game console supporting the online multiplayer game;
  process the communicated signals;
  identify and/or validate the player based on processing of the communicated signals; and
  pair with the audio basestation based on the identifying and/or validating of the player, wherein the pairing comprises establishing one or more wireless links between the headset and the audio basestation.

2. The system of claim 1, wherein the audio basestation is integrated into the associated game console, or is a stand-alone device.

3. The system of claim 1, wherein the determined distance corresponds to physical contact between the headset and the audio basestation.

4. The system of claim 1, wherein the user action comprises tapping of the headset onto the audio basestation.

5. The system of claim 1, wherein the communicated signals comprise identification and/or validation information.

6. The system of claim 1, wherein the headset is operable to:
 identify and/or validate the audio basestation based on the processing of the communicated signals; and
 pair with the audio basestation based on the identifying and/or validating of the audio basestation.

7. The system of claim 1, wherein the headset comprises a near field communication (NFC) circuit for facilitating the communication of signals via NFC interface.

8. The system of claim 1, wherein the headset is configured to receive from the audio basestation, via the one or more wireless links, game and chat audio provided by the associated game console.

9. The system of claim 1, wherein the headset is configured to transmit to the audio basestation, via the one or more wireless links, microphone audio for forwarding via the audio basestation to the associated game console.

10. The system of claim 1, wherein the headset is operable to monitor for one or more operation conditions; and determine whether to maintain the pairing with the audio basestation based on the one or more operation conditions.

11. A method, comprising:
 in a headset that is configurable to process audio for a player participating in an online multiplayer game:
  communicating signals with an audio basestation in response to both of the headset coming within a determined distance of the audio basestation and a user action by the user on the headset in relation to the audio basestation, wherein the audio basestation is associated with a game console supporting the online multiplayer game;
  processing the communicated signals;
  identifying and/or validating the player based on processing of the communicated signals; and
  pairing with the audio basestation based on processing of the communicated signals, wherein the pairing comprises establishing one or more wireless links between the headset and the audio basestation.

12. The method of claim 11, wherein the audio basestation is integrated into the associated game console, or is a stand-alone device.

13. The method of claim 11, wherein the determined distance corresponds to physical contact between the headset and the audio basestation.

14. The method of claim 11, wherein the user action comprises tapping of the headset onto the audio basestation.

15. The method of claim 11, wherein the communicated signals comprise identification and/or validation information.

16. The method of claim 11, comprising:
 identifying and/or validating the audio basestation based on the processing of the communicated signals; and
 pairing with the audio basestation based on the identifying and/or validating of the audio basestation.

17. The method of claim 11, wherein the signals are communicated over near filed communication (NFC) interface between the headset and the audio basestation.

18. The method of claim 11, comprising receiving by the headset from the audio basestation, via the one or more wireless links, game and chat audio provided by the associated game console.

19. The method of claim 11, comprising transmitting by the headset to the audio basestation, via the one or more wireless links, microphone audio for forwarding via the audio basestation to the associated game console.

20. The method of claim 11, comprising monitoring for one or more operation conditions; and determining whether to maintain the pairing with the audio basestation based on the one or more operation conditions.

* * * * *